United States Patent [19]
Eisemann

[11] 3,907,304
[45] Sept. 23, 1975

[54] SWITCHING DEVICE, IN PARTICULAR FOR A RECORD PLAYER OR CHANGER

[75] Inventor: Kurt Eisemann, Berlin, Germany

[73] Assignee: U.S. Philips Corporation, New York, N.Y.

[22] Filed: Sept. 28, 1973

[21] Appl. No.: 401,872

[30] Foreign Application Priority Data
Oct. 13, 1972 Germany ............................ 2250127

[52] U.S. Cl. ............................... 274/9 A; 274/10 R
[51] Int. Cl.[2] ........................................ G11B 17/00
[58] Field of Search ........... 274/9 A, 1 R, 9 R, 10 R

[56] References Cited

UNITED STATES PATENTS

| | | | |
|---|---|---|---|
| 2,529,019 | 11/1950 | Hardy | 274/9 A |
| 3,101,950 | 8/1963 | Schneider | 274/9 A |
| 3,297,328 | 1/1967 | Dennis | 274/10 R |

*Primary Examiner*—Richard E. Aegerter
*Assistant Examiner*—Steven L. Stephan
*Attorney, Agent, or Firm*—Frank R. Trifari; David R. Treacy

[57] ABSTRACT

A switching device for the control operations initiating the playing cycle of a phonograph record, including a drum body which is rotatable by means of a switching member, for controlling the setting-up diameter of the tone arm, selecting the turntable speed, and starting the changing and playing mechanism.

3 Claims, 8 Drawing Figures

SWITCHING DEVICE, IN PARTICULAR FOR A RECORD PLAYER OR CHANGER

The invention relates to a switching device, in particular for a record player or changer, for the switching and control operations to be performed for initiating the playing cycle of a phonograph record, comprising a switching member which is rotably attached to the upper surface of a mounting plate, which member acts on a control device which is located underneath and fixed to the mounting plate.

In known record changers or record players (hereinafter referred to simply as record changers) two or more control members are employed, which are actuated independently of each other or which independently of each other automatically perform switching functions, in order to enable a phonograph record to be played. For example, there is always at least one switch or a switching device which upon actuation operates automatically, to pre-select the setting-up diameter of the tone arm. Furthermore, the drive speed is set at a separate switch and finally at least one switch or switching mechanism, electrically connects the motor to initiate the changing cycle and to disengage and engage the idler wheel. Accordingly, to put a record player into operation, several operations must always be performed. In the most unfavorabe case may lead to records being played incorrectly; e.g., by selecting the wrong speed.

It is an object of the invention to obviate erroneous settings without limiting the playing facilities by incorporating a simple central switching device.

According to the invention this is achieved by causing a rotatable switching member underneath, which control device comprises at least one drum body which is rotatable by means of the switching member. The drum body cooperates with control members of the changing and playing mechanism which initiate the switching and control operations.

In a preferred embodiment of the invention the drive motor can be switched on, the desired turntable speed and the tone-arm setting-up diameter can be selected, and the changing cycle as well as the disengagement and engagement operations of the idler wheel can be initiated by means of separately operating curved surfaces and carriers of the drum body.

More particularly, according to another embodiment of the invention, a switching arm for the motor switch abuts against a starting cam when the switching member, which takes the form of a lever, is rotated out of the zone position. Moreover, the drum body can be rotated out of a central zero position in opposite directions to initiate playing cycles at 33 or 45 r.p.m., the speed switch which is initially set to 33 r.p.m. butting against a cam which causes said switch to change over when the drum is rotated in the direction for 45 r.p.m.

In a further embodiment of the invention a carrier spring which is secured to the drum body moves a diameter slide into the position for 30-cm records, when the drum body is rotated in the direction of 33 r.p.m. playing cycles.

In a still further embodiment of the invention the switching device is provided with a latching lever which engages with latching cavities for 33 r.p.m. and 45 r.p.m. playing cycles after the drum body is rotated in the relevant direction. The drum body can then only be returned by exerting greater force on the toggle, causing the curved surface with the latching cavity to recede.

In yet another embodiment of the invention the drum body can be rotated beyond the latched positions for 33 and 45 r.p.m. into starting positions, in which switching cams move a starting rod for initiating the playing cycle.

In still another embodiment of the invention the drum body is provided with a zero cavity with which a latching roller disposed on a slide engages in the zero position of the drum. Thus, in addition to the latched positions for the two selectable speeds of 33 and 45 r.p.m., the zero and off-position also is a preferred position of the switching device.

According to a further embodiment of the invention the drum body lifts the latching roller out of the zero cavity when it is rotated out of the zero position, the slide being axially moved and a pre-tensioned spindle releasing and idler wheel, which frictionally connects the drive motor to the turntable. Thus, at the same time that the drum body is rotated and the latching roller is lifted out, the turntable is started.

Finally, in a still further embodiment of the invention, the spindle of the latching roller is not completely disengaged from the zero cavity, at least in the latched positions for 33 and 45 r.p.m., and consequently the drum body is constantly subjected to a torsional pretension in the rotating direction towards the zero position by the latching roller which is constantly pressed against it under pretension. Consequently, the drum body will not remain in the starting position during starting, but will always return to the first latched cavity, from which it can then only be returned to the zero and off-position by exerting greater force on the actuating lever. When the switching device according to the invention is used, it is therefore necessary only to turn the switching member or the lever into a starting position in the desired direction for 33 or 45 r.p.m. playing cycles. From the starting position the drum body then returns to a latching cavity. As the drum body is rotated all the operations required for a playing cycle are initiated, i.e. the motor is switched on, the tone arm setting up diameter and the speed are set, the changing or playing cycle is initiated and at the same time the idler wheel is made to engage and disengage.

The invention will now be described by way of example with reference to the drawing, in which.

Figure 7:
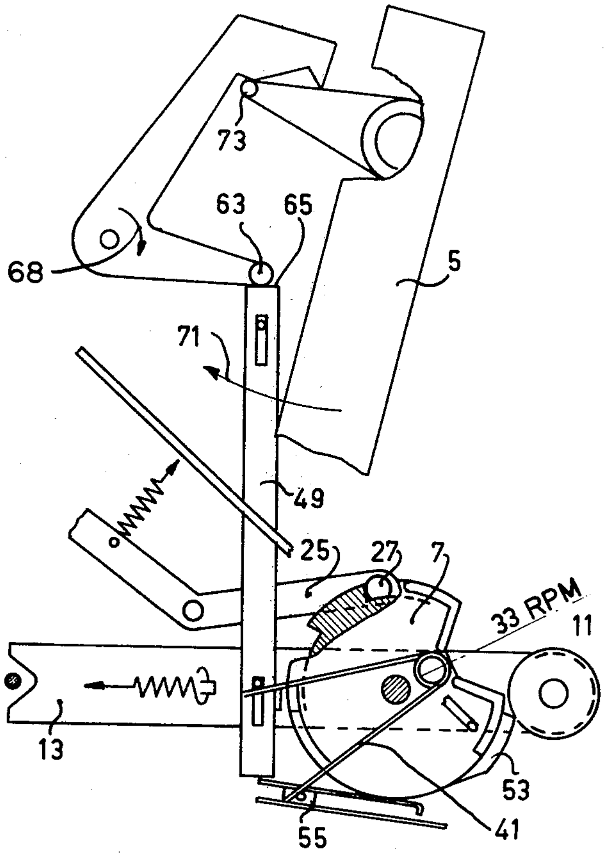
Figure 8:
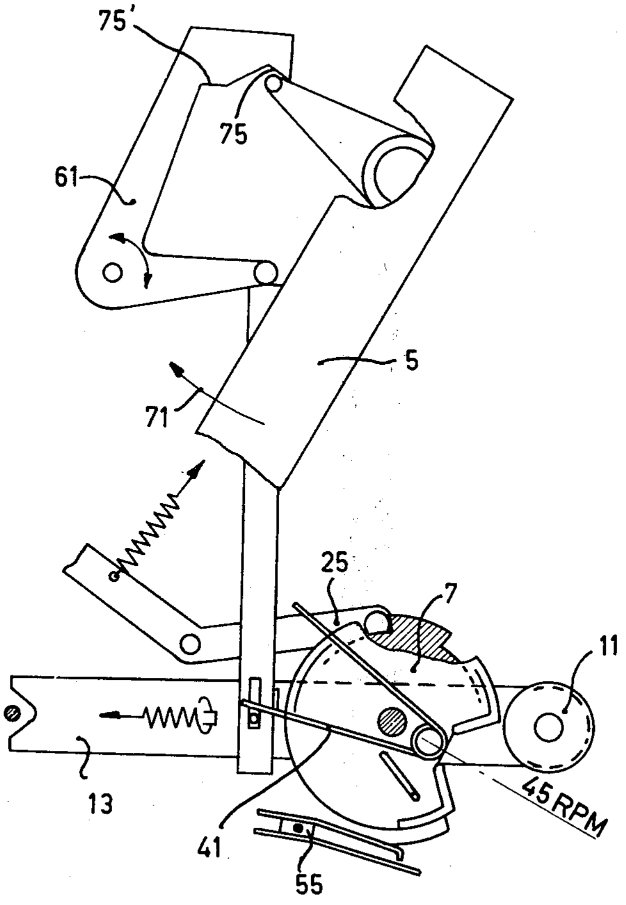

FIG. 7 shows the control device in its latched position for 33 r.p.m. with engaged diameter stop for 30 cm records, FIG. 8 shows the control device in the latched position for 45 r.p.m. with engaged diameter stop for records of 17 cm diameter.

Figure 1:
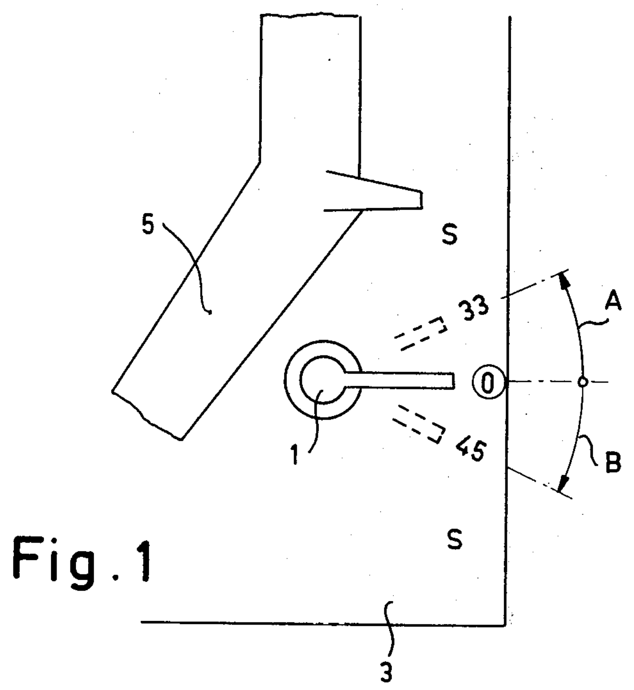
FIG. 1 is a top plan view of the cover plate of a record changer which includes a switching device according to the invention, the switching lever being in the combined zero and off-position.
Figure 2:
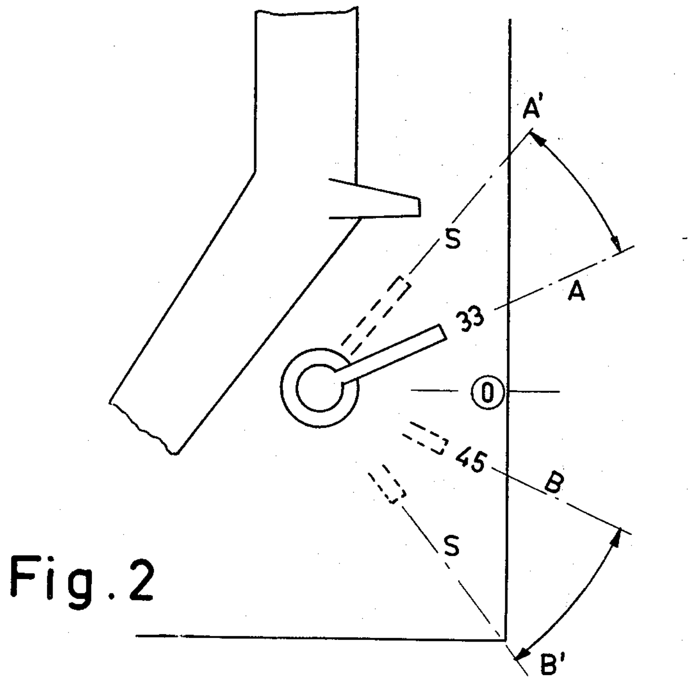
FIG. 2 is a top plan view according to FIG. 1, but with the switching lever being latched in a latched position for playing at 33 r.p.m.
Figure 3:
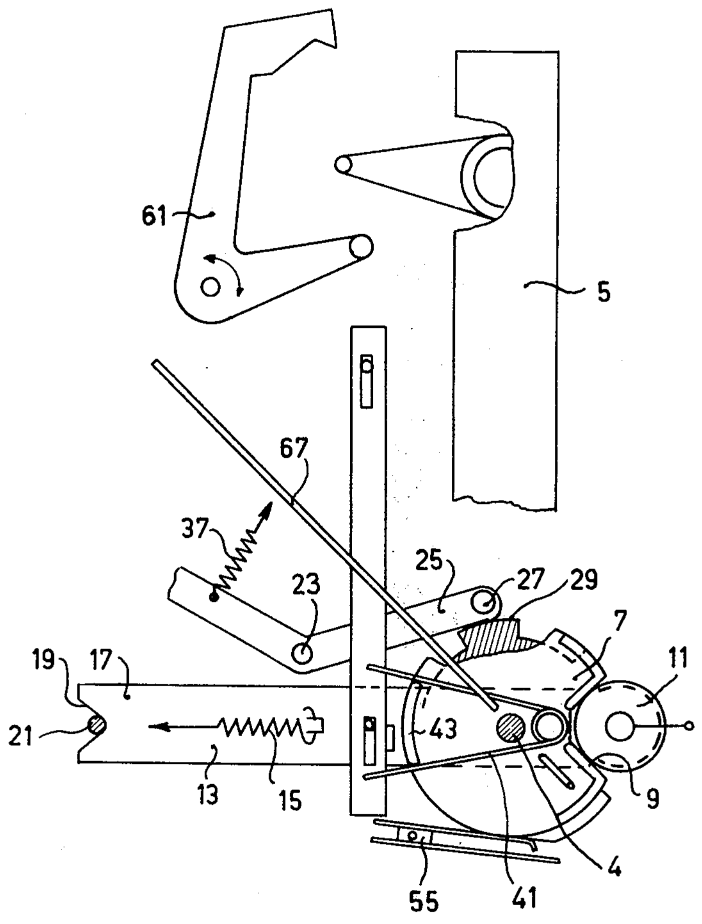
FIG. 3 is a top plan view of the control device which is actuated by the switching lever, said device being in the zero and off-position.

To initiate all the switching and control operations of a record changer adapted for speeds of 33 r.p.m. and 45 r.p.m., a control device is provided, which is shown in FIGS. 3 to 8, and which is actuated with the aid of a switching lever 1 as shown in FIG. 1. The switching lever is disposed on the upper surface of the cover plate 3 of a record changer. The tone arm of the record changer is designated 5. The switching lever 1 can be set to a zero/off position, which is half-way between two latched positions for 33 and 45 r.p.m., which positions can be reached by movements in the direction of the arrows A and B. When turned beyond the latched positions for 33 and 45 r.p.m. the lever can be set to starting positions in which the record changer is put into operation in a manner to be described hereinafter. The switching lever, as is shown in FIG. 2, can be set to the indicated starting positions by moving it in the directions of the double arrows A' and B'. The starting positions are not latched, and after being released the lever always returns to the adjacent locked position for 33 or 45 r.p.m. as the case may be.

FIGS. 3 to 8 show which parts of the changing mechanism are reset or actuated when the lever setting is changed. An essential part in the control device shown in FIG. 3 to 8 is a drum body 7. The drum body 7 is provided with a zero cavity 9 at its circumference, which in the zero-off-position engages with a latching roller 11. The latching roller 11 is rotatably connected to a slide 13, which by means of a tension spring 15 is pretensioned in its longitudinal direction, so that it pulls the latching roller 11 into the zero cavity 9. At the end 17 of the slide 15 which is remote from the point of attachment of the latching roller 11 a groove 19 is provided, which is open in the longitudinal direction of the slide, and which when the latching roller 11 is located in the cavity 9, engages with the spindle 21 of an idler wheel between the drive motor and the turntable.

When the drum body 7 is rotated in the direction of the speed of 33 r.p.m. by turning the lever 1 the latching roller 11 is lifted out of the zero cavity 9. Moreover, the slide 13 then releases the idler wheel spindle 21, because the slide has now travelled a distance *a* (see FIG. 4) to the right. As the idler wheel spindle 21 is released it is possible for the idler wheel to engage the motor drive wheel and the turntable, thus causing the turntable to rotate.

Figure 4:
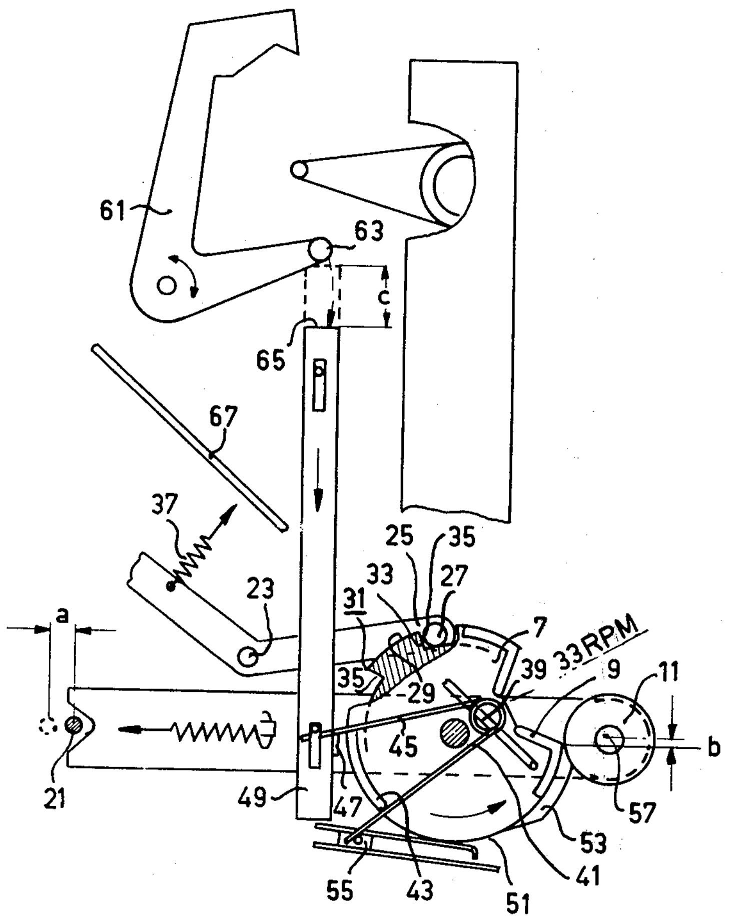
FIG. 4 shows the control device in the latched position for 33 r.p.m.

A latching lever 25 is pivoted to a spindle 23, which is connected to the cover plate of the apparatus. A latching pin 27 is riveted to the latching lever 25. The latching pin 27, which bears against the front portion 29 of a curved surface 31 in the position of the drum body 7 shown in FIG. 3, has moved so far relative to the curved surface 31 when the drum body 7 is turned as shown in FIG. 4 that it engages a latching cavity 33. The latching pin 27 does not return to the zero position of FIG. 3, because return is prevented by a stop surface 35 of the latching cavity 33. A tension spring 37 ensures that the latching lever 25 always engages the drum body 7.

A protrusion 39 is provided on the drum body extending parallel to the axis of the drum body. A hairpin spring 41 is mounted on the protrusion 39 and is kept expanded by a ridge 43 on the drum body 7. As the drum body is rotated as shown in FIG. 4, a leg 45 of the hairpin spring engages a raised tab 47 of a diameter slide 49 and moves it downwards in accordance with the rotating direction. The significance of this movement is to be further explained hereinafter.

On the surface 51 of the drum body 7 a cam 53 is located. Said cam 53 cooperates with a speed selector 55. The speed selector switch 55 is subsequently set so that the turntable rotates with 33 r.p.m. when the switch is open. However, when the cam 53 butts against the switch 55 (FIG. 8), the drive system is changed over to 45 r.p.m.

With reference to FIG. 4 it is to be noted that when the latching pin 27 engages with the latching cavity 33, the spindle of the latching roller 11 has not left the zero cavity 9 viewed in the direction of the slide. Therefore, as long as the latching pin 27 is in the cavity, a force is exerted on the drum body 7 which tends to return the drum body to the zero position. In FIG. 4*b* denotes the length over which the spindle 57 of the latching roller is still in the cavity.

Figure 5:
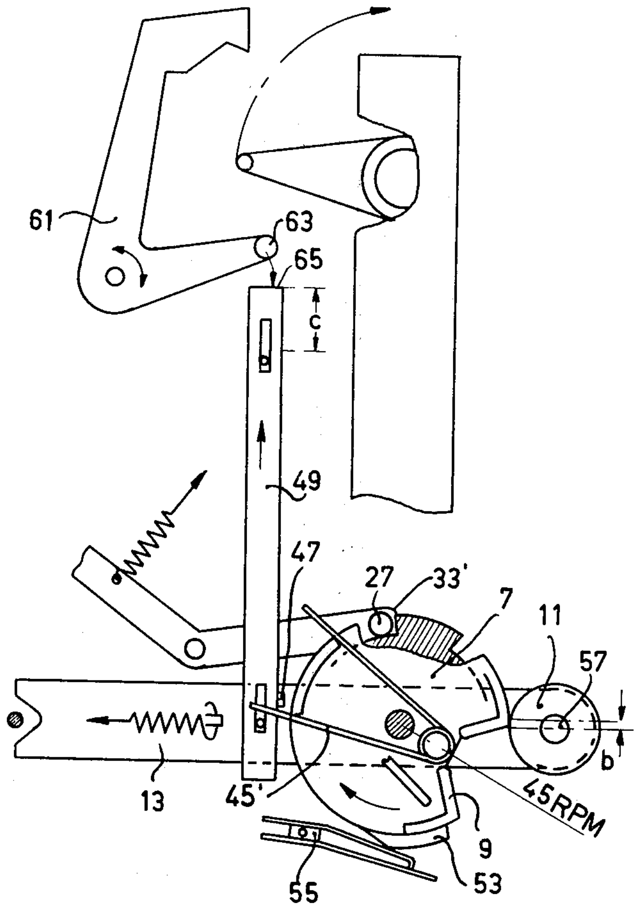
FIG. 5 shows the control device in the latched position for 45 r.p.m.
Figure 6:
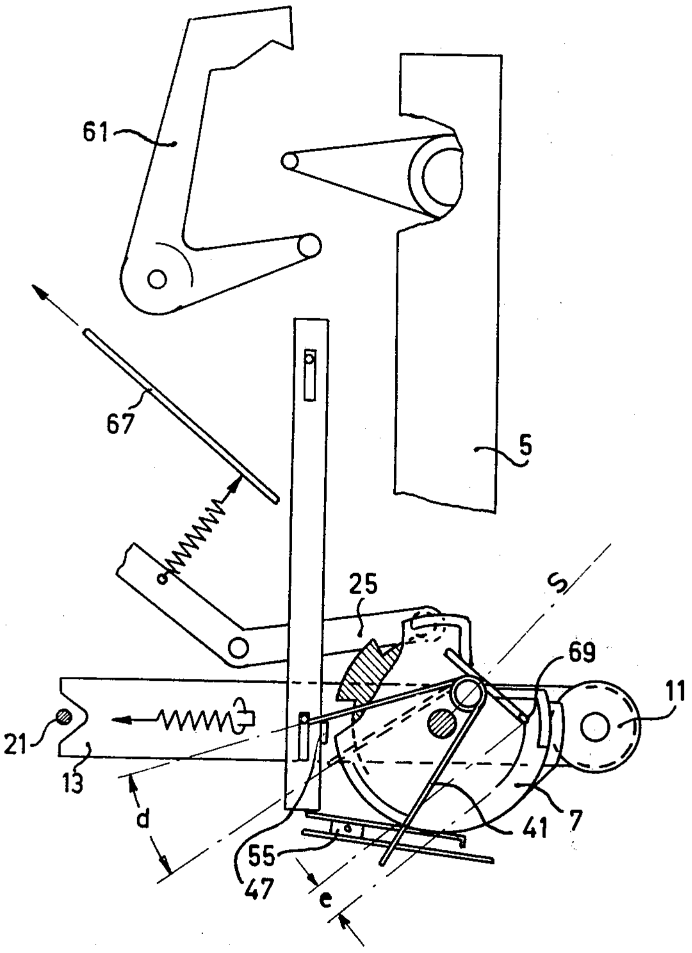
FIG. 6 shows the control device in the springloaded starting position for 33 r.p.m.

When the drum body 7, as is shown in FIG. 5, is turned out of the zero position in the opposite direction, the latching pin 27 engages with the latching cavity 33'. At the same time the latching roller 11 has rolled up the other flank of the zero notch 9, the length of the spindle 57 inside the zero cavity 9 again being *b* viewed in the direction of the slide 13. The speed selector switch 55 is closed, and consequently the turntable is driven at 45 r.p.m. The leg 45' of the hairpin spring 41 has moved the diameter slide 49 upwards in accordance with the rotating direction, the leg 45' having struck the raised tab 47 in the opposite direction.

The two positions of the diameter slide 49 shown in FIGS. 4 and 5 are programmed stop positions for a toggle lever 61, which with its contact face 63 can butt against an end 45 of the diameter slide 49 (FIGS. 7 and 8). When the switching lever 1 is set from position A to the starting position A' or from position B to the starting position B' (FIG. 2), the relevant leg 45 or 45' of the hairpin spring 41 is tensioned by the amount *d* (FIG. 6) to the left or to the right, so that a return force for the drum body 7 is obtained. When the switching lever 1 is released, it returns as far as the relevant stop face 35 or 35' of the curved surface 31 through the action of the hairpin spring. The drum body 7 being rotated into the starting position causes a switching rod 67, which is connected to the drum body by a pivot 69, to move forwards over a distance *e* (FIG. 6), so that a starting switch for the changing cycle initiates the lowering process of the tone arm. As the changing cycle is initiated the toggle lever 61 is rotated in the direction of the arrow 68, so that its contact face 63 butts against the end 65 of the diameter slide (FIG. 7). The tone arm 5 which swings inwards in the direction of the arrow 71 stops at a setting up diameter when the stop 73, which is rigidly connected to it, butts against the relevant face 75 or 75' of the toggle lever 61. Prior to the termination of the changing cycle the toggle lever 61 is withdrawn again, so that the stop 73 and thus the tone arm 5 can advance freely (FIG. 5). The travel of the diameter slide 49 for the two dropping diameters is denoted by *c* in FIGS. 4 and 5.

Resetting the control device to the zero position is possible only when the switching lever 1 is pressed towards the zero position with increased force. This forces the latching pin 27 to run outward along the stop surface 35 onto the face 29 of the curved surface 31.

The latching disc 11 then engages with the zero cavity 9 in the zero position.

What is claimed is:

1. A switching device for a phonograph record changer of the type having means for controlling the speed of a turntable and means for selecting a tone-arm setting-up diameter, comprising a single switching member connected to a single control device for positioning said device in a selected one of a plurality of positions, and means responsive solely to the position of said device for controlling the speed of the turntable and the tonearm setting-up diameter, wherein said control device is movable at least to first and second positions, said responsive means controlling said turntable speed at a first speed and said setting-up diameter at a first diameter when said device is in said first position, said responsive means controlling said turntable speed at a second speed different from said first speed and said setting-up diameter at a second diameter different from said first diameter when said device is in said second position; and wherein said means for selecting a tone-arm setting-up diameter comprises a tab movable between first and second tab positions, and said control device comprises a hairpin spring, and a ridge projecting from said device between the legs of said spring so as to keep the spring in an expanded condition, said tab being disposed between the ends of the hairpin spring for engagement thereby, said tab being held in said first tab position when said control device is in said first position, said tab being held in said second tab position when said control device is in said second position.

2. A switching devices as claimed in claim 1, wherein said switching device comprises latching roller means for controlling a function of said changer, and biasing means, said switching member is movable between first speed start, first speed, off, second speed, and second speed start positions in that order, said control device connected thereto moving between corresponding first start, first, off, second, and second start positions, said control device further comprising a cam surface having a latching cavity, said latching roller being biased against said cam surface by said biasing means, said roller engaging said cavity when said control device is in the off position, said latching roller being only partially disengaged from said latching cavity when said control device is in said first and second positions so that said control device is then biased toward said off position by the biasing force exerted on said latching roller.

3. A switching device as claimed in claim 2, wherein said latching roller is fully disengaged from said cavity when said control device is in said first start and second start positions, said hairpin spring engaging said tab being sprung out of contact with said ridge when said control device is in said start positions for biasing said control device toward said first and second positions.

* * * * *

UNITED STATES PATENT AND TRADEMARK OFFICE

CERTIFICATE OF CORRECTION

PATENT NO. : 3907304

DATED : September 23, 1975

INVENTOR(S) : KURT EISEMANN

It is certified that error appears in the above-identified patent and that said Letters Patent are hereby corrected as shown below:

Column 1, line 26, "unfavorabe" should be --unfavorable-- line 33, after "member" insert --on the upper surface of a mounting plate to act on a control device located--

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*